(12) United States Patent
Vanstaan et al.

(10) Patent No.: US 12,337,453 B2
(45) Date of Patent: Jun. 24, 2025

(54) FUEL CELL ADAPTER FOR FASTENER DRIVING TOOL

(71) Applicant: Illinois Tool Works Inc., Glenview, IL (US)

(72) Inventors: Valery H. Vanstaan, Highland Park, IL (US); Ninad C. Maniar, Gurnee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/630,656

(22) Filed: Apr. 9, 2024

(65) Prior Publication Data

US 2024/0253198 A1   Aug. 1, 2024

Related U.S. Application Data

(63) Continuation of application No. 18/056,040, filed on Nov. 16, 2022, now Pat. No. 11,992,925.

(60) Provisional application No. 63/282,392, filed on Nov. 23, 2021.

(51) Int. Cl.
  *B25C 1/08* (2006.01)
  *B25C 1/00* (2006.01)

(52) U.S. Cl.
  CPC .............. *B25C 1/08* (2013.01); *B25C 1/008* (2013.01)

(58) Field of Classification Search
  CPC .. B25C 1/008; B25C 1/08; B25C 1/04; B25C 1/18; F17C 2270/0763; F17C 13/04; F17C 2205/0373; F17C 2270/0545; F17C 2201/0104; F17C 2201/0119; F17C 2201/058; F17C 2205/0323; F17C 2205/0335
  See application file for complete search history.

(56) References Cited

U.S. PATENT DOCUMENTS

| | | | |
|---|---|---|---|
| 4,403,722 | A | 9/1983 | Nikolich |
| 4,483,474 | A | 11/1984 | Nikolich |
| 4,522,162 | A | 6/1985 | Nikolich |
| D294,820 | S | 3/1988 | Belletire |
| 5,115,944 | A | 5/1992 | Nikolich |
| D405,315 | S | 2/1999 | Lioi |
| D420,462 | S | 2/2000 | Menter |
| 6,095,704 | A | 8/2000 | Jaeger et al. |
| 6,176,412 | B1 | 1/2001 | Weinger et al. |

(Continued)

FOREIGN PATENT DOCUMENTS

| | | |
|---|---|---|
| EP | 0278873 A1 | 8/1988 |
| EP | 1254745 A2 | 11/2002 |

(Continued)

OTHER PUBLICATIONS

International Search Report and Written Opinion from International Application No. PCT/US2022/080026, mailed on Feb. 23, 2023 (13 pages).

(Continued)

*Primary Examiner* — Veronica Martin
(74) *Attorney, Agent, or Firm* — Neal, Gerber & Eisenberg LLP (57) ABSTRACT

A combustion powered fastener driving tool including a fuel cell receiving block shaped and sized to receive and engage a fuel cell adapter of a fuel cell, the fuel cell adapter shaped and sized to form a fluid tight seal with the fuel cell receiving block.

12 Claims, 10 Drawing Sheets

(56) References Cited

U.S. PATENT DOCUMENTS

| | | |
|---|---|---|
| 6,217,085 B1 | 4/2001 | Toulouse |
| 6,302,297 B1 | 10/2001 | Richardson et al. |
| 6,371,338 B1 | 4/2002 | Klein et al. |
| D457,811 S | 5/2002 | Vanstaan et al. |
| 6,523,860 B1 | 2/2003 | Shkolnikov et al. |
| 6,796,478 B2 | 9/2004 | Shkolnikov et al. |
| 7,302,971 B2 | 12/2007 | Myntti |
| 7,392,922 B2 | 7/2008 | Vanstaan et al. |
| D577,100 S | 9/2008 | Brown et al. |
| D582,437 S | 12/2008 | Shimomura et al. |
| D582,440 S | 12/2008 | Shimomura et al. |
| 7,478,740 B2 | 1/2009 | Shea et al. |
| D590,840 S | 4/2009 | Shea et al. |
| 7,571,841 B2 | 8/2009 | Gibson et al. |
| 7,591,249 B2 | 9/2009 | Wagdy et al. |
| 7,654,429 B2 | 2/2010 | Shea et al. |
| 7,661,568 B2 | 2/2010 | Vanstaan et al. |
| 7,677,420 B1 | 3/2010 | Greer et al. |
| 7,757,920 B2 | 7/2010 | Shea et al. |
| D633,922 S | 3/2011 | Shea et al. |
| D645,053 S | 9/2011 | Shea et al. |
| 8,157,130 B2 | 4/2012 | Murayama et al. |
| 8,302,831 B2 | 11/2012 | Taylor et al. |
| D681,677 S | 5/2013 | Shea et al. |
| D721,789 S | 1/2015 | Lu |
| 8,939,339 B2 | 1/2015 | Vanstaan et al. |
| D739,919 S | 9/2015 | Alexander et al. |
| 9,505,509 B2 | 11/2016 | Smith |
| D787,326 S | 5/2017 | Hanson et al. |
| 9,802,303 B2 | 10/2017 | Vanstaan et al. |
| D812,101 S | 3/2018 | Crawford et al. |
| 10,166,666 B2 | 1/2019 | Shea et al. |
| 10,226,614 B2 | 3/2019 | Tumminaro et al. |
| D873,301 S | 1/2020 | Crawford et al. |
| D875,139 S | 2/2020 | Crawford et al. |
| 10,598,377 B2 | 3/2020 | Crawford et al. |
| 2004/0206798 A1 | 10/2004 | Robinson |
| 2005/0230451 A1 | 10/2005 | Vanstaan et al. |
| 2007/0251376 A1 | 11/2007 | Toulouse et al. |
| 2007/0251967 A1 | 11/2007 | Taylor et al. |
| 2008/0000451 A1* | 1/2008 | Shea .................. B25C 1/08 227/120 |
| 2008/0110953 A1 | 5/2008 | Gibson et al. |
| 2011/0248063 A1 | 10/2011 | Taylor et al. |
| 2014/0175143 A1 | 6/2014 | Vanstaan et al. |
| 2016/0045072 A1 | 2/2016 | Myoung |
| 2020/0232642 A1 | 7/2020 | Crawford et al. |
| 2022/0069266 A1 | 3/2022 | Maniar et al. |

FOREIGN PATENT DOCUMENTS

| | | |
|---|---|---|
| EP | 2815851 A2 | 12/2014 |
| FR | 2771796 A1 | 6/1999 |

OTHER PUBLICATIONS

ECKO FuelCell Cordless Fastening System Images, Available prior to Nov. 23, 2021 (3 pages).

ECKO MultiCell, ECKO Fastening Systems, Available prior to Nov. 23, 2021 (4 pages).

Paslode Quicklode Fuel Cartridge Image, http://static.grainger.com/rp/s/is/image/Grainger/31EE19_AS01?hei=800&wid=935, Jan. 19, 2016 (1 page).

Yagid Rob, "Cordless Finish Nailer", Fine Homebuilding, 2011 (2 pages).

\* cited by examiner

FUEL CELL ADAPTER FOR FASTENER DRIVING TOOL

PRIORITY

This application is a continuation of and claims priority to and the benefit of U.S. patent application Ser. No. 18/056,040, which was filed Nov. 16, 2022, which claims priority to and the benefit of U.S. Provisional Patent Application No. 63/282,392, filed Nov. 23, 2021, the entire contents of each of which are incorporated herein by reference in their entirety.

FIELD

The present disclosure relates to fastener driving tools, specifically to combustion powered fastener driving tools with improved fuel cell adapters.

BACKGROUND

Generally, powered fastener driving tools use one of several types of power sources to carry out a fastener driving cycle to drive a fastener (such as a nail or a staple) into a workpiece. More specifically, a powered fastener driving tool uses a power source to force a driving assembly, such as a piston carrying a driver blade, through a cylinder from a pre-firing position to a firing position. As the driving assembly moves to the firing position, the driver blade travels through a nosepiece, which guides the driver blade to contact a fastener housed in the nosepiece. Continued movement of the driving assembly through the cylinder toward the firing position forces the driver blade to drive the fastener from the nosepiece into the workpiece. The driving assembly is then forced back to the pre-firing position in a way that depends on the tool's construction and power source. A fastener advancing device forces another fastener from a magazine into the nosepiece, and the tool is ready to fire again.

Combustion powered fastener driving tools are one type of powered fastener driving tools that typically use a small internal combustion assembly as their power source. To operate various known combustion powered fastener driving tools, an operator depresses a workpiece contact element of the tool onto a workpiece. This moves the workpiece contact element from an extended position to a retracted position, which causes one or more mechanical linkages to cause: (1) a valve sleeve of the tool to move to a sealed position to seal a combustion chamber of the tool that is in fluid communication with the cylinder; and (2) a fuel delivery system of the tool to dispense fuel from a replaceable fuel cell positioned in the tool into the (now sealed) combustion chamber.

The operator then pulls the trigger to actuate a trigger switch, thereby causing a spark generator to deliver a spark and ignite the fuel/air mixture in the combustion chamber to start the fastener driving cycle. This generates high-pressure combustion gases that expand and act on the piston to force the driving assembly to move through the cylinder from the pre-firing position to the firing position, thereby causing the driver blade to contact a fastener housed in the nosepiece and drive the fastener from the nosepiece into the workpiece.

The fuel delivery system is configured to receive a replaceable fuel cell and dispense a desired amount of fuel to the combustion chamber for each combustion event. The replaceable fuel cell should be sealed within the combustion powered fastener driving tool to prevent unwanted leakage of fuel from the fuel cell.

However, to seal the fuel supply stored in the fuel delivery system, certain known combustion powered fastener driving tools rely on sealing components that are susceptible to performance degradation caused by changes in environmental conditions (such as extreme heat or cold), dimensional tolerances, age, and other conditions. For example, when certain known combustion powered fastener driving tools operate in relatively cold temperatures, they do not optimally perform. For example, the sealing components of the fuel delivery systems of these known tools may provide variable sealing of the fuel cell such that under certain conditions current combustion powered fastener driving tools experience fuel leaks from these sealing components that engage the replaceable fuel cell in the tool. Thus, there is a need for a combustion powered fastener driving tool that provides more consistent and stable sealing components of the fuel delivery system that minimize fuel leakage.

SUMMARY

Various embodiments of the present disclosure provide a combustion powered fastener driving tool that solves the above problems in part by including more stable fluid tight seal for a fuel assembly to better minimize fuel leakage.

In various example embodiments of the present disclosure, the fastener driving tool includes a housing, a fastener driving assembly at least partially positioned in, connected to, and supported by the housing, a handle assembly connected to the housing, a fastener magazine assembly connected to the housing and the handle assembly, a workpiece contact assembly connected to the housing, and a fuel assembly at least partially positioned in, supported by, and connected to the housing. The fuel assembly includes or is configured to receive a fuel cell adapter that is shaped and sized to better engaged and be better engaged by a fuel cell receiving block to better sealingly engage the fuel cell adapter connected to a replaceable fuel cell that stores a fuel supply for the fastener driving tool.

Other objects, features, and advantages of the present disclosure will be apparent from the following detailed disclosure and accompanying drawings.

DETAILED DESCRIPTION

While the systems, devices, and methods described herein may be embodied in various forms, the drawings show, and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

For a better understanding of the present disclosure, an example known combustion powered fastener driving tool is first partially described. Various embodiments of the combustion powered fastener driving tool of the present disclosure can include certain identical or similar components as described below.

Figure 1:
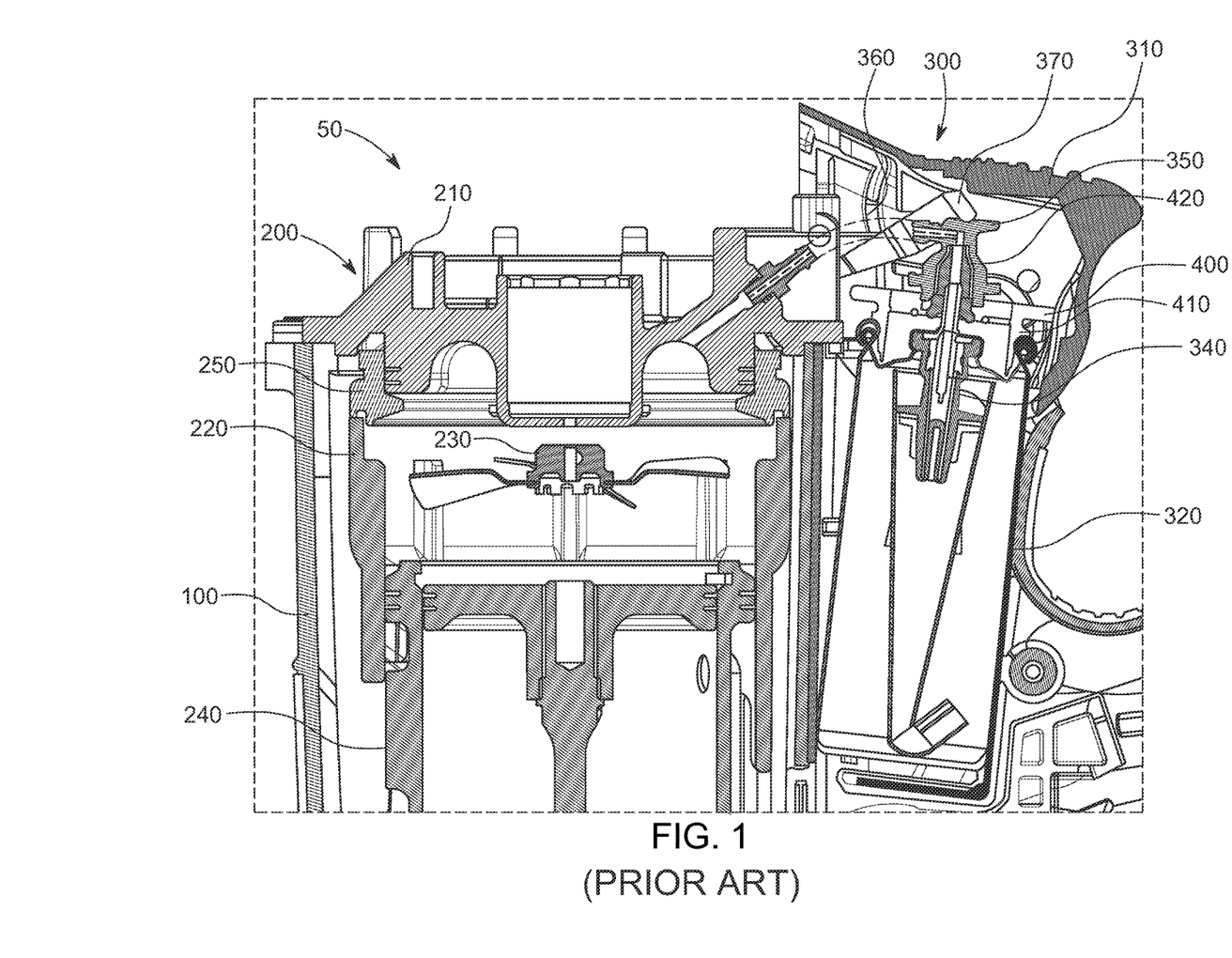
FIG. 1 is an enlarged fragmentary side cross-sectional view of part of a known fastener driving tool showing the fuel assembly mounted in the housing and showing part of the fastener driving assembly.
Figure 2:
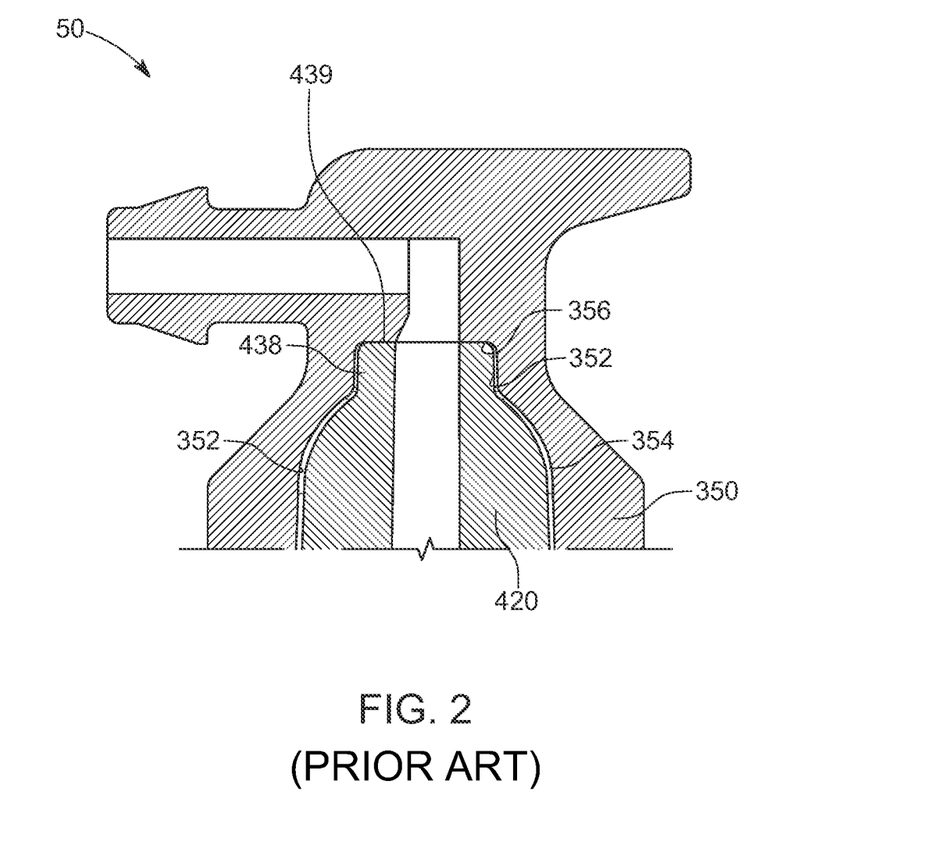
FIG. 2 is an enlarged fragmentary cross-sectional view of a part of the known fuel assembly of the fastener driving tool of FIG. 1, showing the fuel cell block mounted on a known fuel cell adapter.

FIGS. 1 and 2 illustrate an example known combustion powered fastener driving tool 50 (that is sometimes referred to herein as "known tool" for brevity). FIGS. 1 and 2 show selected components of the example known tool 50 including: (1) a housing 100; (2) a fastener driving assembly 200 partially positioned in, supported by, and connected to the housing 100; and (3) a fuel assembly 300 partially positioned in, supported by, and connected to the housing 100.

In the illustrated fastener driving tool 50, the fastener driving assembly 200 includes: (1) a cylinder head 210; (2) a combustion chamber 220 suitably connected to the cylinder head 210; (3) a fan motor 230 suitably mounted to the cylinder head 210 and projecting into the combustion chamber 220; (4) a sleeve 240 suitably connected to the combustion chamber 220; and (5) a combustion chamber ring 250 suitably connected to an upper portion of the combustion chamber 220 and the cylinder head 210.

In the illustrated fastener driving tool 50, the fuel assembly 300 includes: (1) a fuel cell door 310 pivotally connected to the housing 100; (2) a fuel cell 320 receivable in and at least partially supported by the housing 100; (3) a fuel cell adapter 400 suitably connected to the fuel cell 320; (5) a fuel cell metering valve 340 that fluidly communicates with the fuel cell adapter 400 and extending into a portion of the fuel cell 320; (6) a fuel cell receiving block 350 mounted on, connected to, and in fluid communication with the fuel cell adapter 400; (7) a fuel line 360 suitably connected between the fuel cell receiving block 350 and the cylinder head 210 to define a fuel pathway between the fuel cell 320 and the combustion chamber 220; and (8) a fuel dosing lever 370 pivotally supported by the cylinder head 210 and engaged to the fuel cell receiving block 350.

In the illustrated fastener driving tool 50, the fuel cell adapter 400 includes: (1) a fuel cell connector 410; and (2) a stem 420 suitably connected to the fuel cell connector 410. The fuel cell adapter 400 is partially positioned in and received by the fuel cell receiving block 350 to fluidly connect the fuel cell 320 to the fuel cell receiving block 350 as best shown in FIG. 2. In the illustrated known fastener driving tool 50, the fuel cell receiving block 350 includes a plurality of inner surfaces 352 that define an inner stem receiving bore 354. The top surface 422 of the stem 420 of the fuel cell adapter 400 is configured to mate with and create a seal with the bottom surface 356 of the top portion of the stem receiving bore 354 of the fuel cell receiving block 350. During operation, the stem 420 extends into the stem receiving bore 354 such that the fuel cell adapter 400 is in fluid communication with the fuel cell receiving block 350.

More specifically, in this known tool 50, the horizontally extending top surface 439 of the cylindrical portion 438 of the stem 420 engages the horizontally extending bottom inner sealing surface 356 of the stem receiving bore 354. Engagement between these inner surface is meant to form a fluid tight seal between the stem 420 and the fuel cell receiving block 350. However, when the fuel cell 320 is installed in the tool 50 and the fuel cell adapter 400 is engaged to the fuel cell receiving block 350, in certain circumstances (that can be worse in relatively cold temperatures), certain movements and/or repositioning of the fuel cell receiving block 350 relative to the fuel cell adapter 400 (such as caused by actuation of the dosing lever of the tool 50) can cause the disengagement of these surfaces 439 and 356. Accordingly, certain movements of the fuel cell receiving block 350 with respect to the stem 420 can break the seal formed between the fuel cell adapter 400 and the fuel cell receiving block 350. As a result, fuel can leak from the fuel cell 320 into other portions of the known tool 50 in an undesired manner in such certain circumstances.

FIGS. 3 to 10 illustrate the combustion powered fastener driving tool of one example embodiment of the present disclosure that is generally indicated by numeral 1050 (and sometimes referred to herein as the "tool" for brevity). The illustrated example shows selected components of the tool 1050 during actuation of the tool 1050 to drive a fastener (not shown) into a workpiece. Other components of the tool 1050 not discussed herein will be readily understood by those skilled in the art.

Figure 3:
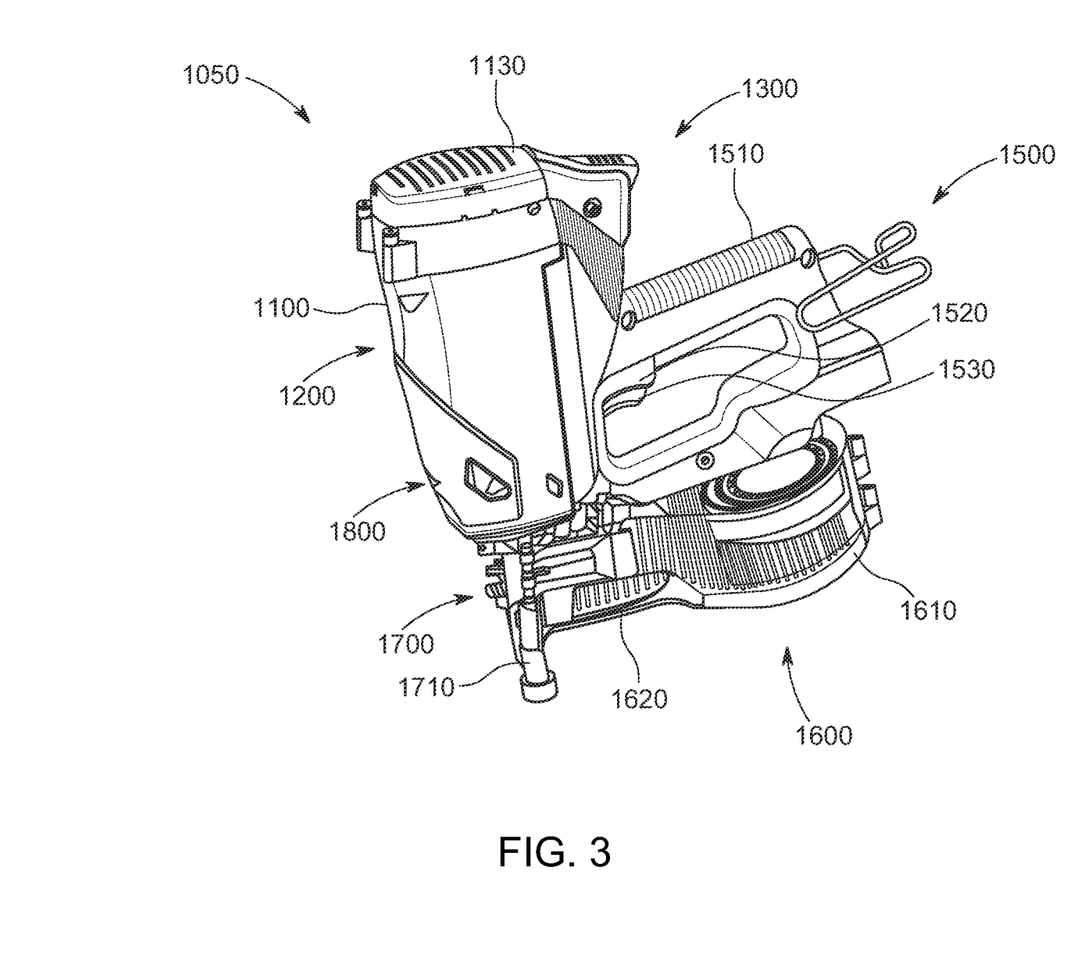
FIG. 3 is a side perspective view of a fastener driving tool of the one example embodiment of the present disclosure.

The illustrated example tool 1050 includes: (1) a housing 1100; (2) a fastener driving assembly 1200 at least partially positioned in, supported by and connected to the housing 1100; (3) a fuel assembly 1300 partially positioned in, supported by, and connected to the housing 1100; (4) a handle assembly 1500 supported by and connected to the housing 1100; (5) a fastener magazine assembly 1600 supported by and connected to the housing 1100 and the handle assembly 1500; (6) a workpiece contact assembly 1700 supported by and connected to the housing 1100; and (7) a nosepiece assembly 1800 supported by and connected to a lower portion of the housing 1100. The illustrated example combustion powered fastener driving tool 1050 in this example is known in the industry as a mid-range combustion powered fastener driving tool; however, it should be understood that the present disclosure can also be applied to what is known in the industry as framing combustion powered fastener driving tools, what is known in the industry as trim combustion powered fastener driving tools, and other combustion powered tools.

The housing 1100 includes: (1) a first wall 1110; (2) a second wall 1120 opposite of the first wall; and (3) a housing cap 1130 suitably connected to the first and second walls 1110 and 1120 of the housing 1100. The housing 1100 thus provides a suitable protective enclosure for the fastener driving assembly 1200, parts of the fuel assembly 1300, and other components of the tool 1050.

Figure 10:
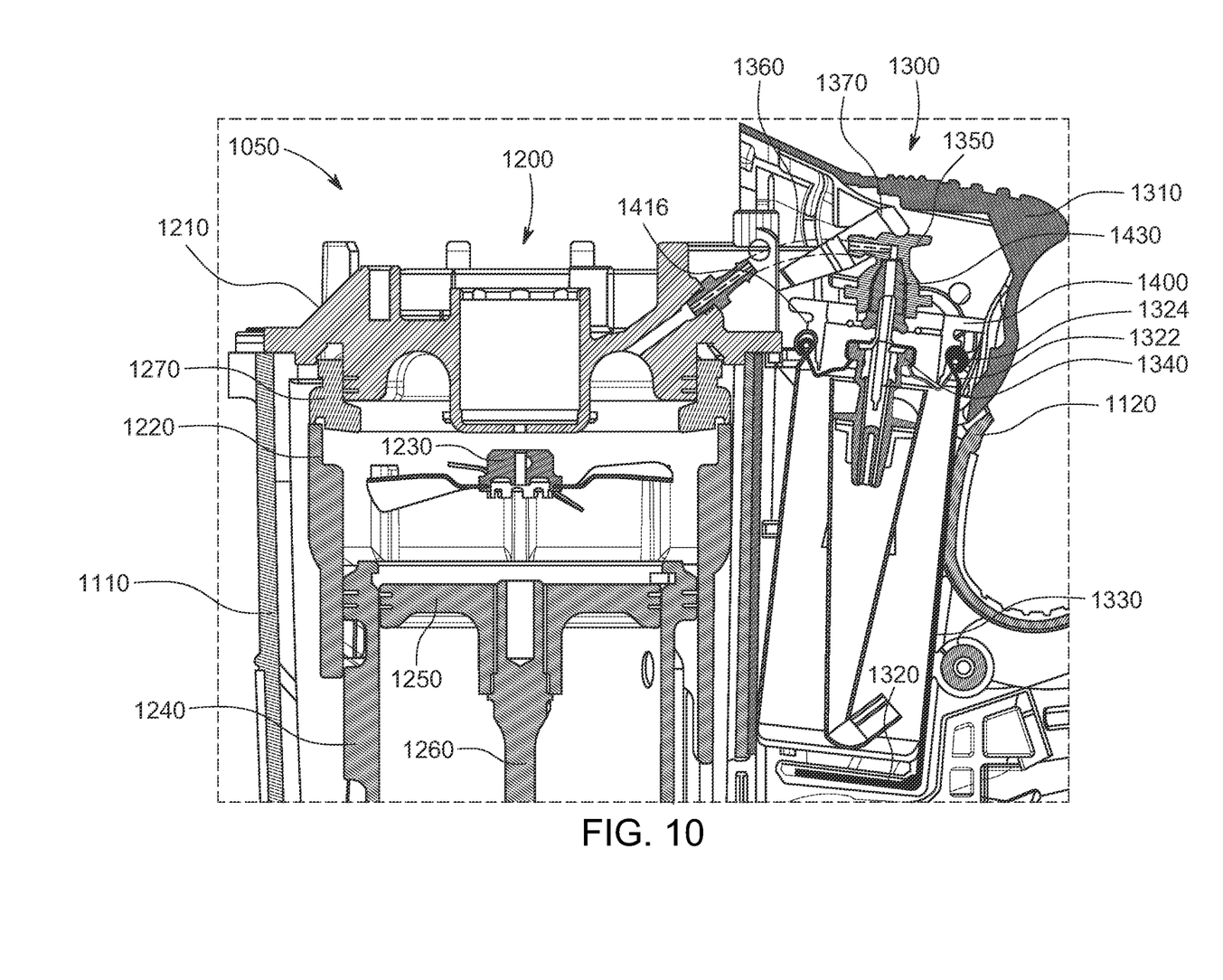
FIG. 10 is an enlarged fragmentary cross-sectional view of the fastener driving tool of FIG. 3, showing the fuel assembly mounted in the housing and showing the fastener driving assembly including the fuel cell adapter of FIG. 4.

The fastener driving assembly 1200 includes: (1) a cylinder head 1210 connected to the housing cap 1130; (2) a combustion chamber 1220 suitably connected to the cylinder head 1210; (3) a fan motor 1230 suitably mounted to the cylinder head 1210 and projecting into the combustion chamber 1220; (4) a cylinder 1240 suitably connected to the combustion chamber 1220; (5) a driving blade 1250 suitably connected to the cylinder 1240; (6) a piston 1260 positioned in the cylinder 1240 and suitably connected to the driving blade 1250; and (7) a combustion chamber ring 1270 positioned between the combustion chamber 1220 and the cylinder head 1210. The combustion chamber ring 1270 suitably connects the cylinder head 1210 to an upper portion of the combustion chamber 1220.

The fuel assembly 1300 includes: (1) a fuel cell door 1310 pivotally connected to the housing cap 1130 of the housing 1100; (2) a fuel cell receiving assembly 1320 positioned in and at least partially supported by the housing 1100 and configured to receive a removable fuel cell 1330; (3) a fuel cell adapter 1400 suitably connected to the fuel cell 1330; (4) a fuel cell metering valve 1340 connected to the fuel cell adapter 1400 and extending into a portion of the fuel cell 1330; (5) a fuel cell receiving block 1350 connected to and in fluid communication with the fuel cell adapter 1400; (6) a fuel line 1360 suitably connected between the fuel cell receiving block 1350 and the cylinder head 1210 to define a fuel pathway between the fuel cell 1330 and the combustion chamber 1220; and (7) a fuel dosing lever 1370 pivotally supported in the housing 1100 and engageable with the fuel cell receiving block 1350. The fuel cell receiving block 1350 and the fuel cell adapter 1400 are further described below. It should be appreciated that while the fuel cell 1330 and the fuel cell adapter 1400 of the present disclosure are described herein as part of the fuel assembly 1300 of the tool 1050 for ease of description, that these components will typically be provided separately from the tool 1050 and insertable in the tool 1050, and thus to a certain extent are not part of the fuel assembly 1300, but rather connectable to and operable with the fuel assembly 1300 of the tool 1050.

The handle assembly 1500 includes: (1) a gripping portion 1510; (2) a trigger mount 1520 defined on the gripping portion 1510; and (3) a trigger 1530 suitably connected to the trigger mount 1520 via a trigger pin (not shown) such that a portion of the trigger 1530 can move relative to the gripping portion 1510. The handle assembly 1500 is suitably connected to the housing 1100.

The fastener magazine assembly 1600 includes: (1) a fastener cannister 1610 configured to hold a plurality of fasteners (e.g., nails, or staples); and (2) a fastener channel 1620 suitably connected to the nosepiece assembly 1800 and to the fastener cannister 1610. During operation of the tool 1050, a fastener is delivered, via the fastener channel 1620, to the nosepiece assembly 1800 and driven into the workpiece by the fastener driving assembly 1200.

The workpiece contact assembly 1700 includes a workpiece contact element 1710 suitably connected to the nosepiece assembly 1800 and to the fastener magazine assembly 1600. The workpiece contact element 1710 contacts the location where the fastener is driven into the workpiece by the tool 1050.

The nosepiece assembly 1800 is suitably connected to the fastener magazine assembly 1600 and to the cylinder 1240. The nosepiece assembly 1800 receives a fastener from the fastener channel 1620. During operation of the tool 1050, the piston 1260 is driven downward, via the driving blade 1250, in the cylinder 1240, contacts the fastener positioned in the nosepiece assembly 1800 and drives the fastener into the workpiece.

The fuel cell receiving block 1350 and the example fuel cell adapter 1400 of the present disclosure are now further described. FIGS. 4 to 10 illustrate the example fuel cell adapter 1400. The illustrated example fuel cell adapter 1400 includes: (1) a fuel cell connector 1410; and (2) a stem 1430 suitably connected to the fuel cell connector 1410 via a first arm 1460 and via a second arm 1470. In the illustrated example, the fuel cell adapter 1400 is fabricated from a suitable polymer or plastic material configured to withstand the operational conditions of the tool 1050. As such, the fuel cell adapter 1400 can be molded or otherwise fabricated to form a monolithic structure including the fuel cell connector 1410, the stem 1430, the first arm 1460, the second arm 1470 and other such moldable features and components of the fuel cell adapter 1400. It should be understood that the stem 1430, the first arm 1460, and the second arm 1470 can alternatively be formed as two or more separate components that are suitably connected or that are fastened to the fuel cell connector 1410 during fabrication of the fuel cell adapter 1400.

Figure 4:
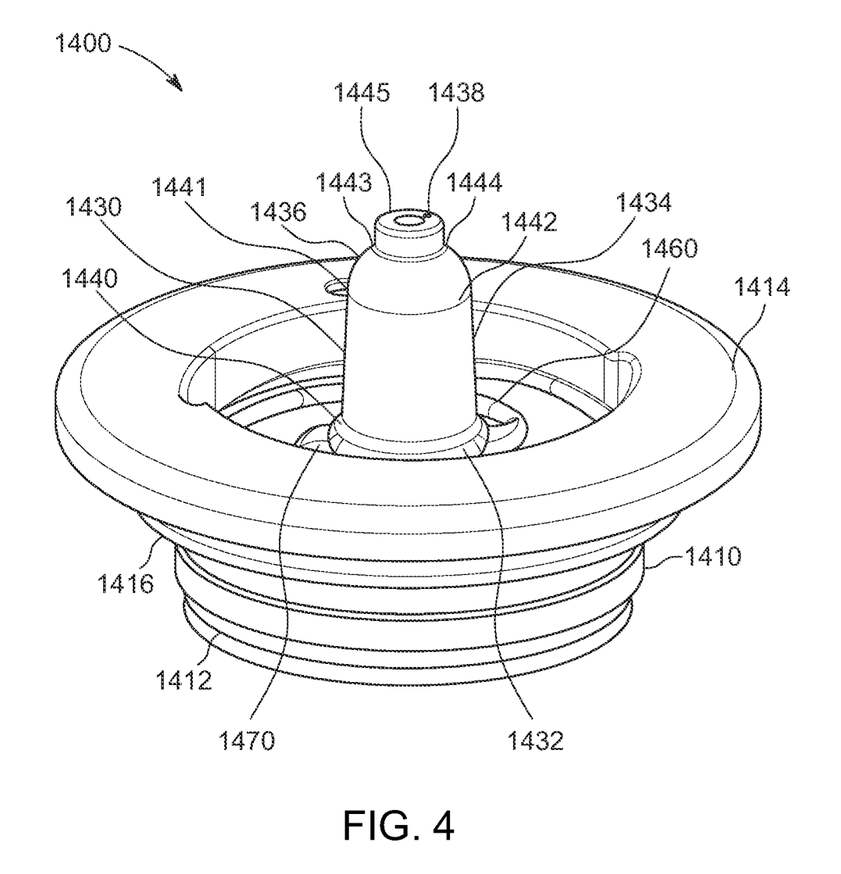
FIG. 4 is an enlarged perspective view of the fuel cell adapter of the fastener driving tool of FIG. 3, showing an arcuate outer surface of at least a portion of the adapter stem of the fuel cell adapter.

The fuel cell connector 1410 includes: (1) a fuel cell connection portion 1412; (2) a first flange 1414; (3) a second flange 1416; and (4) a plurality of interior surfaces 1418 that define a fuel cell receiver 1420 shaped and sized to receive at least a portion of the fuel cell metering valve 1340 and the fuel cell 1330. In the illustrated example embodiment, the fuel cell adapter 1400 engages a top 1322 of the fuel cell 1330 and the fuel cell connector 1410 and the second flange 1416 engage a bead 1324 that circumferentially surrounds the top 1322 of the fuel cell 1330. Engagement of the fuel cell adapter 1400 with the fuel cell 1330 causes at least a portion of the fuel cell 1330 to extend into the fuel cell receiver 1420. In the illustrated example embodiment, at least a portion of the fuel cell metering valve 1340 extends through the fuel cell receiver 1420 and into the stem 1430 to fluidly connect the fuel cell 1330 to the fuel cell adapter 1400.

In certain embodiments, the fuel cell adapter 1400 is fixedly attached to the to the fuel cell 1330 such that the fuel cell adapter 1400 and the fuel cell 1330 form a unitary component that can be connected and removed from the tool 1050. In other embodiments, the fuel cell 1330 is removable from the fuel cell adapter 1400 such that the fuel cell 1330 can be disconnected from the fuel cell adapter 1400 and replaced with a different fuel cell. The fuel cell connector of the fuel cell adaptor can be configured as various different manners in accordance with the present disclosure such as but not limited to the configurations described in commonly assigned U.S. Pat. Nos. 10,166,666, 10,654,156, and 10,850,378, all of which are incorporated by reference herein.

Figure 5:
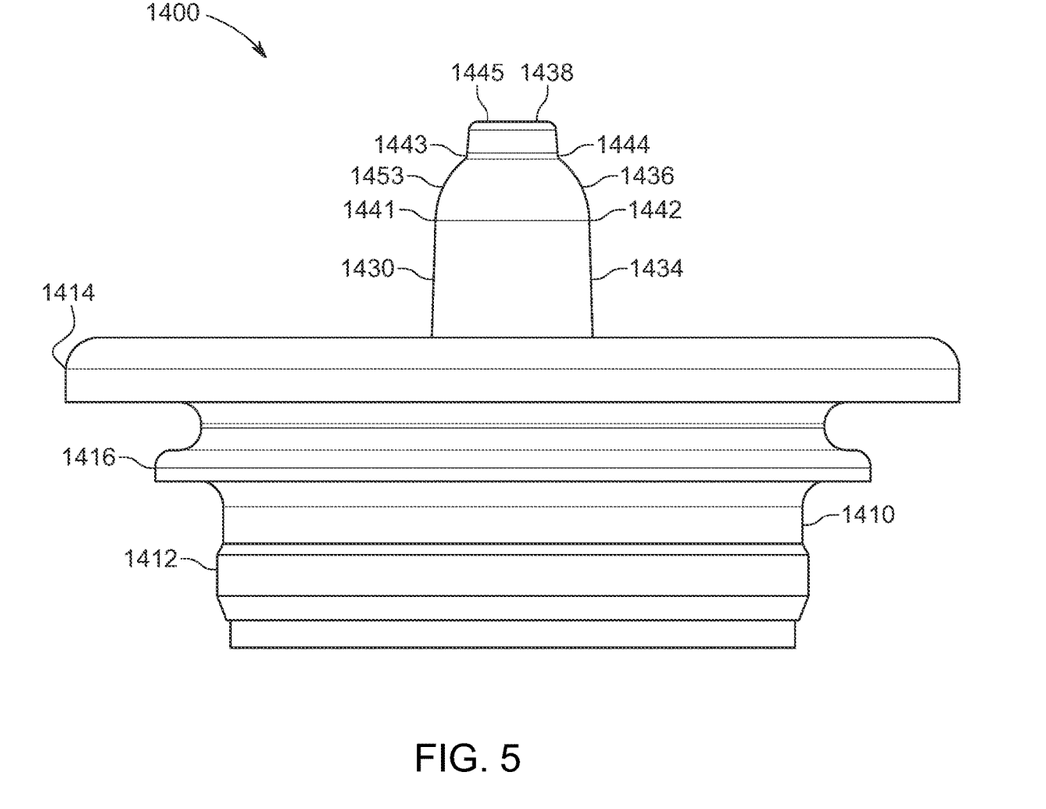
FIG. 5 is an enlarged side view of the fuel cell adapter of FIG. 4, showing the arcuate outer surface of a portion of the adapter stem of the fuel cell adapter.
Figure 6:
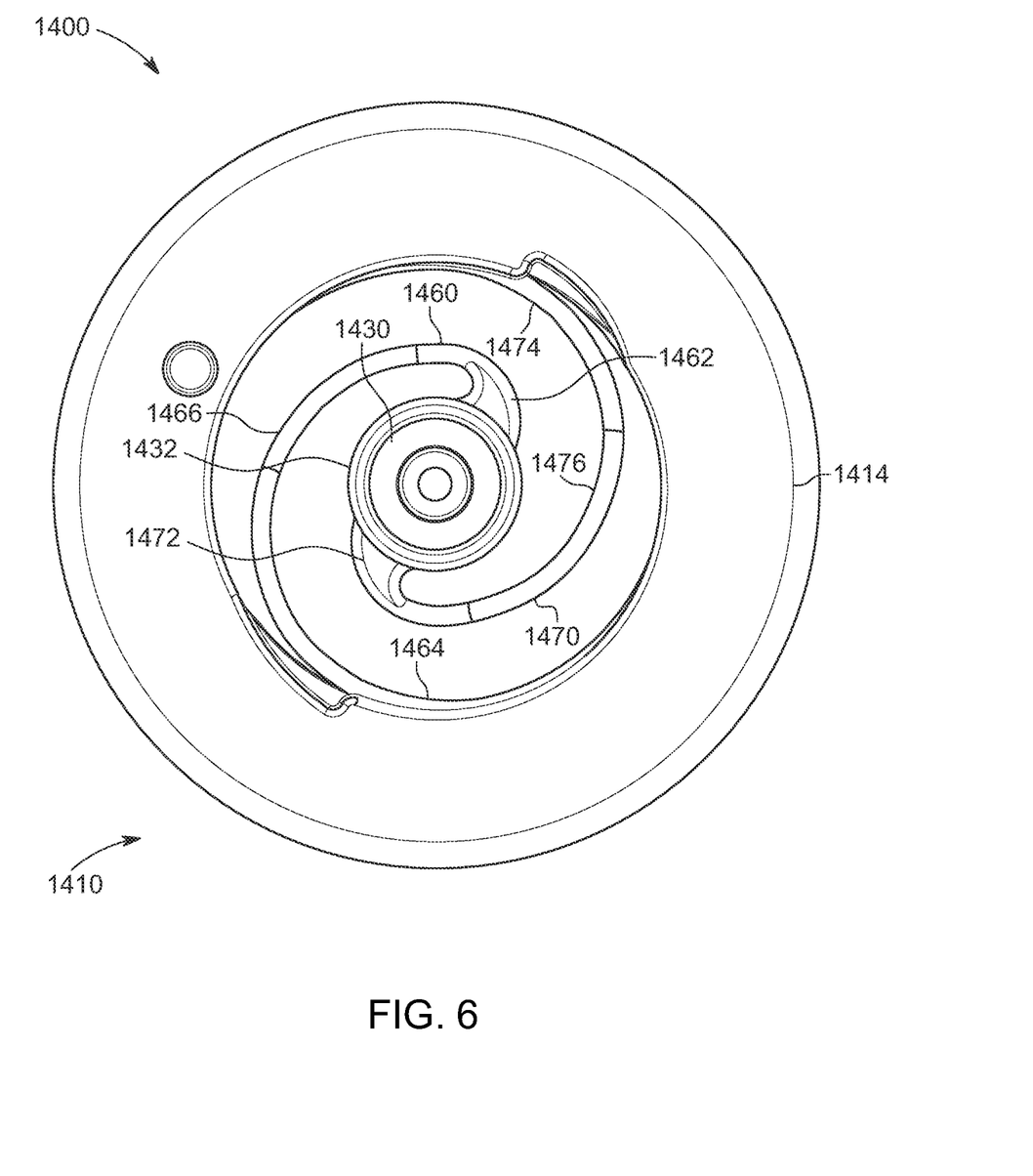
FIG. 6 is an enlarged top view of the fuel cell adapter of FIG. 4.
Figure 7:
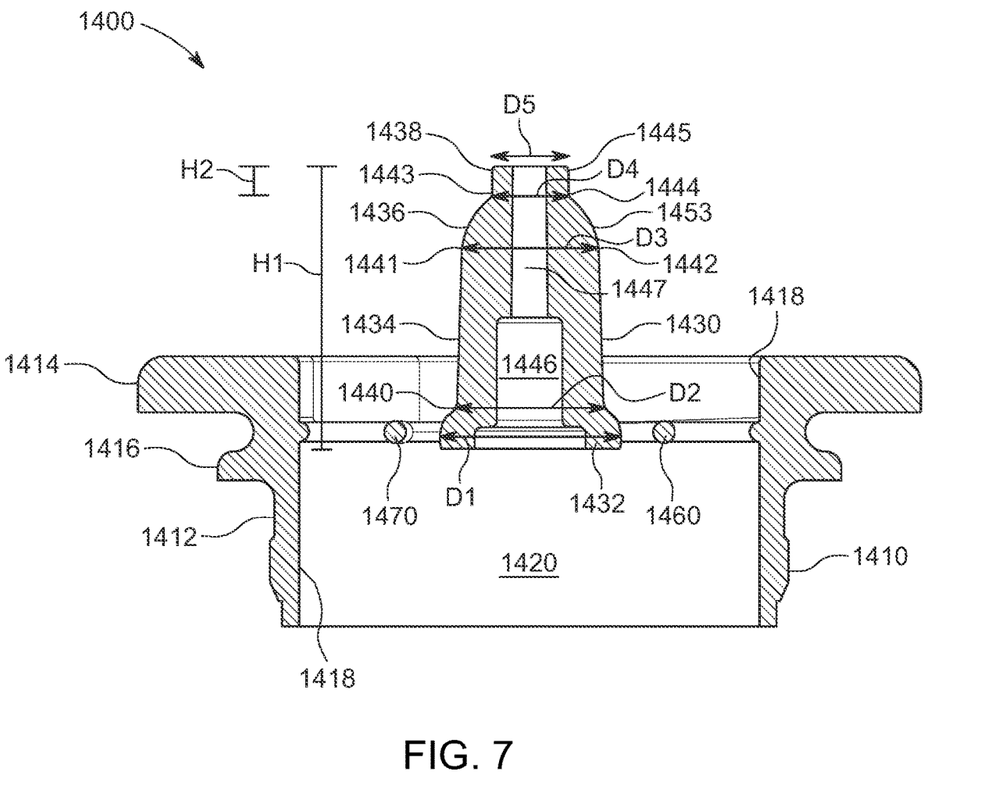
FIG. 7 is an enlarged side cross-sectional view of the fuel cell adapter of FIG. 4, showing the arcuate outer surface of a portion of the adapter stem of the fuel cell adapter.

In the illustrated example fuel cell adapter 1400, the stem 1430 includes: (1) a base 1432 suitably connected to the first arm 1460 and the second arm 1470; (2) a first conical portion 1434 connected to, supported by and extending axially upward from the base 1432; (3) a sealing portion 1436 connected to, supported by and extending axially upward from the first conical portion 1434; and (4) a second conical portion 1438 connected to, supported by and extending axially upward from the sealing portion 1436.

The first arm 1460 includes: (1) a stem attachment portion 1462 suitably connected to the base 1432 of the stem 1430; (2) a connector attachment portion 1464 suitably connected to the fuel cell connector 1410; and (3) a central portion 1466 extending between the stem attachment portion 1462 and the connector attachment portion 1464.

The second arm 1470 includes: (1) a stem attachment portion 1472 suitably connected to the base 1432 of the stem 1430; (2) a connector attachment portion 1474 suitably connected to the fuel cell connector 1410; and (3) a central portion 1476 extending between the stem attachment portion 1472 and the connector attachment portion 1474.

The first arm 1460 and the second arm 1470 form a spiral support structure that connects the stem 1430 to the fuel cell connector 1410. As best shown in FIGS. 4, 6, 7, 8, and 10, the first arm 1460 and the second arm 1470 position the stem 1430 in at least a portion of the fuel cell receiver 1420 of the fuel cell adapter 1400 such that the stem 1430 connects to the fuel cell metering valve 1340.

In the illustrated example fuel cell adapter 1400, the different sections of the stem 1430 have specific shapes and dimensions that cause specific desired engagements and seals or sealing locations between the fuel cell adapter 1400 and the fuel cell receiving block 1350.

In this example, the stem 1430 includes: (1) a first outer diameter (D1) that is substantially between 0.30 and 0.35 inches (0.762 to 0.889 cms) (e.g., within manufacturing tolerances) to define a width of the base 1432; (2) a second outer diameter (D2) that is substantially between 0.27 and 0.29 inches (0.6858 to 0.7366 cms) (e.g., within manufacturing tolerances) to define a width of a bottom end 1440 of the first conical portion 1434; (3) a third outer diameter (D3) that is substantially between 0.250 and 0.265 inches (0.635 to 0.6731 cms) (e.g., within manufacturing tolerances) to define a width of a top end 1441 of the first conical portion 1434, the third outer diameter (D3) also defines the width of a bottom end 1442 of the sealing portion 1436; (4) a fourth outer diameter (D4) that is substantially between 0.14 and 0.16 inches (0.3556 to 0.4964 cms) (e.g., within manufacturing tolerances) to define a width of a top end 1443 of the sealing portion 1436, the fourth outer diameter (D4) also defines the width of a bottom end 1444 of the second conical portion 1438; and (5) a fifth outer diameter (D5) that is substantially between 0.14 and 0.16 inches (0.3556 to 0.4964 cms) (e.g., within manufacturing tolerances) to define a width of a top end 1445 of the second conical portion 1438.

In the illustrated example embodiment, D1>D2>D3>D4 and D4 and D5 are about equal (or such that D5 is slightly less than D4) such that the base 1432 has the largest outer diameter (i.e., D1) and the second conical portion 1438 has the smallest outer diameter (i.e., D5). D2 is larger than D3 such that the first conical portion 1434 is tapered between the bottom end 1440 and the top end 1441 of the first conical portion 1434. D3 is larger than D4 such that the sealing portion 1436 includes an arcuate or domed shaped outer sealing surface 1453 defined along the outer surface and extending between the bottom end 1442 and the top end 1443 of the sealing portion 1436. D4 is larger than D5 such that the second conical portion 1438 is tapered between the bottom end 1444 and the top end 1445 of the second conical portion 1438. As further described below, the outer sealing surface 1453 of the sealing portion 1436 (rather than the top end 1445) is shaped and sized to engage the fuel cell receiving block 1350 and form a fluid tight seal between the fuel cell adapter 1400 and fuel cell receiving block 1350). In the illustrated example, the outer sealing surface 1453 is defined axially below the second conical portion 1438.

Figure 8:
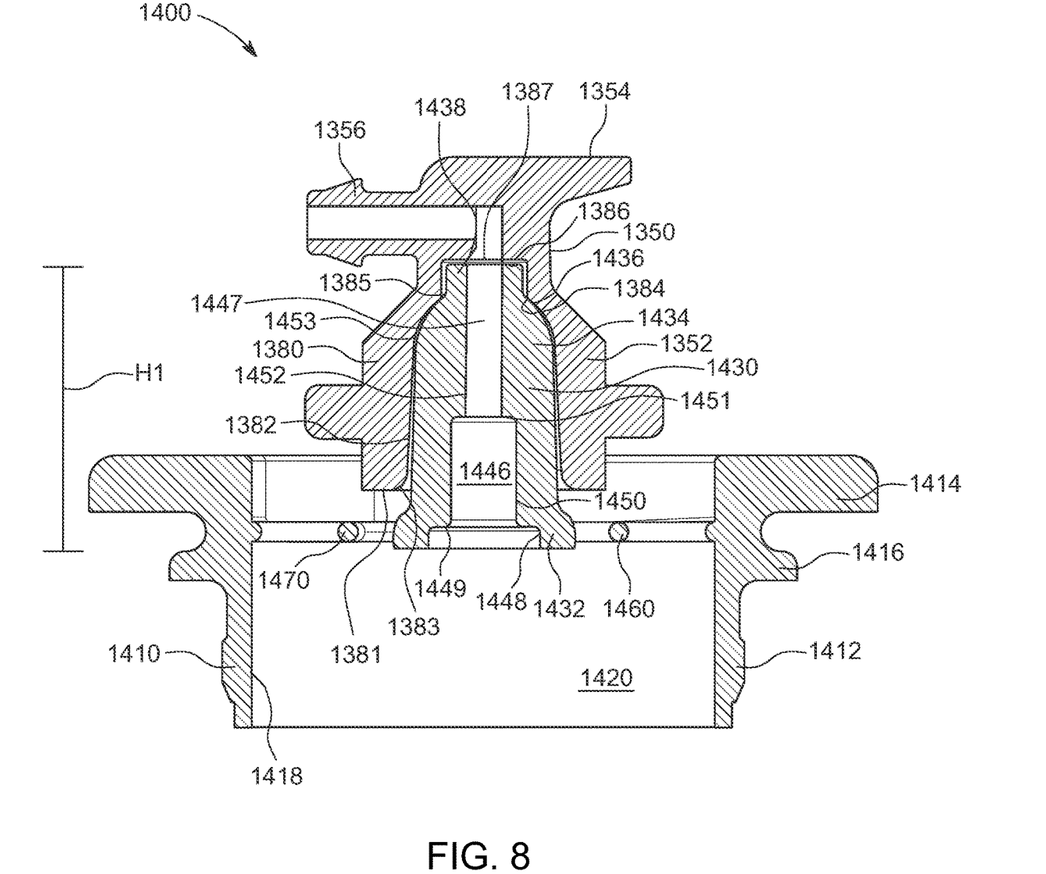
FIG. 8 is an enlarged cross-sectional view of a portion of the fuel assembly of the fastener driving tool of FIG. 3, showing the fuel cell block mounted on the adapter stem of the fuel cell adapter of FIG. 4.

In the illustrated example embodiment, the stem 1430 has a height (H1) extending between the base 1432 and the second conical portion 1438 that is substantially between 0.53 and 0.54 inches (1.3462 to 1.3716 cm) (e.g., within manufacturing tolerances). The second conical portion 1438 has a height (H2) extending between the bottom end 1444 and the top end 1445 of the second conical portion that is substantially between 0.050 and 0.055 inches (0.127 to 0.1397 cm) (e.g., within manufacturing tolerances). As further described below, the height (H2) of the second conical portion 1438 of the stem 1430 is shaped and sized to define a fuel receiving gap 1387 or space between the second conical portion 1438 of the stem 1430 and the fuel cell receiving block 1350. The fuel receiving gap 1387 has a height (H3) defined between the second conical portion 1438 and the fuel cell receiving block 1350. In the illustrated example embodiment, the second conical portion 1438 of the stem 1430 does not engage or contact the fuel cell receiving block 1350.

In the illustrated example fuel cell adapter 1400, the different sections or portions of the stem 1430 have a plurality of interior surfaces that define a metering valve receiver 1446 and a fuel passageway 1447 in the stem 1430. For example, the metering valve receiver 1446 includes: (1) a first cylindrical inner surface 1448; (2) a first annular inner surface 1449 connected to the first cylindrical inner surface 1448; (3) a second cylindrical inner surface 1450 connected to the first annular inner surface 1449; and (4) a second annular surface 1451 connected to the first cylindrical surface 1448. The fuel passageway 1447 includes a conical surface 1452 connected to the second annular surface 1451 of the metering valve receiver 1446 and extends through the top end 1445 of the second conical portion 1438 of the stem 1430. In the illustrated example, the metering valve receiver 1446 is shaped and sized to receive at least a portion of the fuel cell metering valve 1340. The fuel passageway 1447 is fluidly connected to the metering valve receiver 1446 such that fuel dispensed from the fuel cell metering valve 1340 is transported through the fuel passageway 1447 and into the fuel cell receiving block 1350.

Figure 9:
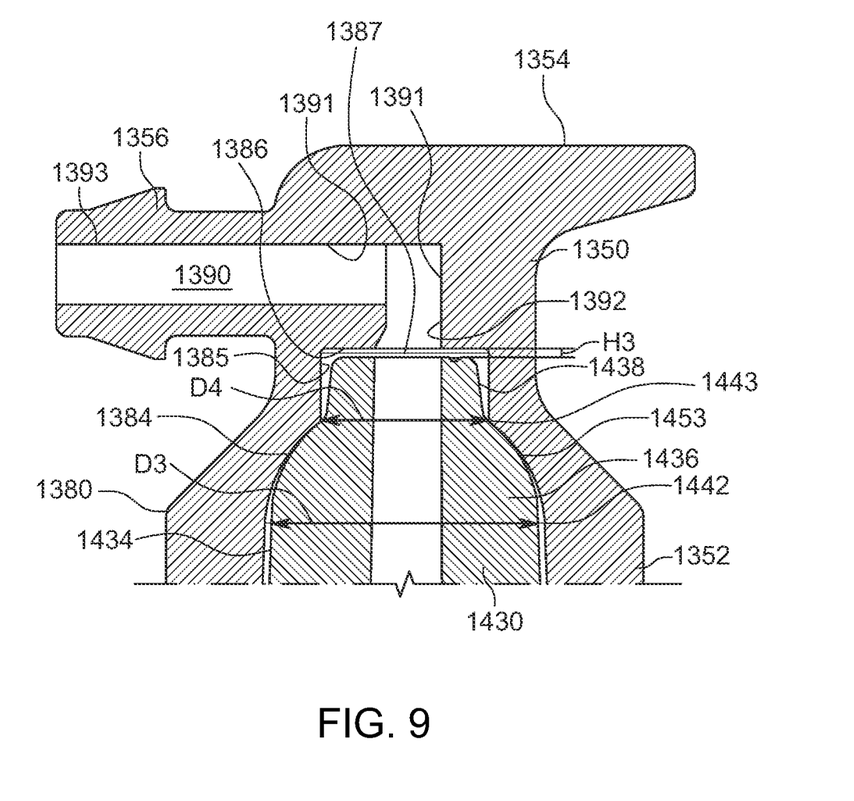
FIG. 9 is an enlarged fragmentary side cross-sectional view of a portion of the fuel assembly of the fastener driving tool of FIG. 3, showing the fuel cell block mounted on the adapter stem of the fuel cell adapter of FIG. 4.

FIGS. 8 to 10 illustrate the example fuel cell receiving block 1350 of the tool 1050. The fuel cell receiving block 1350 is fluidly connected to the fuel cell adapter 1400 and shaped and sized to sealingly engage and connect to the stem 1430. The illustrated example fuel cell receiving block 1350 includes: (1) a stem connector 1352; (2) a dosing lever engager 1354; and (3) a fuel line connector 1356.

In the illustrated example embodiment, the stem connector 1352 of the fuel cell receiving block 1350 includes a stem receiving portion 1380 defined by a plurality of surfaces of the fuel cell receiving block 1350. More specifically, the stem receiving portion 1380 is defined by: (1) an outer annular surface 1381; (2) an inner conical surface 1382 connected to the outer annular surface 1381 via a fillet 1383; (3) an inner sealing surface 1384 connected to the inner conical surface 1382; (4) an inner cylindrical surface 1385 connected to the inner conical surface 1382; and (5) an inner bottom annular surface 1386 connected to the inner cylindrical surface 1385.

In the illustrated example embodiment, the shape and size of the stem receiving portion 1380 is configured to correspond to the shape and size of the stem 1430 of the fuel cell adapter 1400. As best shown in FIGS. 8 and 9, the stem 1430 of the fuel cell adapter 1400 is received by the stem receiving portion 1380 and engaged to least a portion of the fuel cell receiving block 1350. More specifically, the inner conical surface 1382 of the stem receiving portion 1380 corresponds with the tapered shape of the first conical portion 1434 of the stem 1430. The width of the stem receiving portion 1380 defined by the inner conical surface 1382 is slightly larger than the width of the first conical portion 1434. As such, when the fuel cell receiving block 1350 is connected to the fuel cell adapter 1400, there is a fuel receiving gap between the inner conical surface 1382 of the stem receiving portion 1380 and the first conical portion 1434 of the stem 1430.

In the illustrated example embodiment, the inner sealing surface 1384 of the stem receiving portion 1380 has an arcuate or domed shape that corresponds with the arcuate or domed shape of the sealing portion 1436 of the stem 1430. At least a portion of a width of the stem receiving portion 1380 defined by the inner sealing surface 1384 is substantially equal to (e.g., within manufacturing tolerances) at least a portion of the width of the sealing portion 1436. As such, when the fuel cell receiving block 1350 is connected to the fuel cell adapter 1400, a fluid tight seal is formed between at least a portion of the inner sealing surface 1384 of the fuel cell receiving block 1350 and the outer sealing surface 1453 of the sealing portion 1436 of the stem 1430.

In the illustrated example embodiment, the outer sealing surface 1453 is defined axially below the second conical portion 1438 of the stem 1430. As such, the arcuate, concave, or domed shape of the inner sealing surface 1384 of the fuel cell receiving block 1350 and the corresponding arcuate, convex, or domed shaped of the outer sealing surface 1453 of the stem 1430 enables adjustment of the fluid tight seal formed between the fuel cell receiving block 1350 and the fuel cell adapter 1400. Thus, the fluid tight seal formed between the inner sealing surface 1384 of the fuel cell receiving block 1350 and the outer sealing surface 1453 of the fuel cell adapter 1400 is maintained if the fuel cell receiving block 1350 moves with respect to the stem 1430. In other words, even if the fuel cell receiving block 1350 moves, the arcuate or domed shape of the outer sealing surface 1453 and the inner sealing surface 1384 enables the stem 1430 to remain sealingly engaged to the fuel cell receiving block 1350. In a wide range of conditions (including in relatively cold temperatures), various different movements and/or repositioning of the fuel cell receiving block 1350 relative to the fuel cell adapter 1400 (such as certain pivotal movements) will not cause fuel leakage or will have extremely reduced amounts of fuel leakage.

In the illustrated example embodiment, the inner cylindrical surface 1385 and the inner bottom annular surface 1386 of the stem receiving portion 1380 correspond with tapered shape of the second conical portion 1438 of the stem 1430. The width of the stem receiving portion 1380 defined by the inner cylindrical surface 1385 is slightly larger than the width of the second conical portion 1438 of the stem 1430. The height of the stem receiving portion 1380 defined by the inner cylindrical surface 1385 and the inner bottom annular surface 1386 is slightly larger than the height (H2) of the second conical portion 1438 of the stem 1430. As such, when the fuel cell receiving block 1350 is connected to the fuel cell adapter 1400 there is a slight fuel receiving gap 1387 between inner cylindrical surface 1385 and the inner bottom annular surface 1386 of the stem receiving portion 1380 and the second conical portion 1438 of the stem 1430. In other words, when the fuel cell receiving block 1350 is connected to the fuel cell adapter 1400 the second conical portion 1438 of the stem 1430 is not engaged with the inner cylindrical surface 1385 and the inner bottom annular surface 1386 of the fuel cell receiving block 1350.

In the illustrated example embodiment, a plurality of surfaces define a fuel passageway 1390 in the fuel cell receiving block 1350. More specifically, inner surfaces 1391 define the fuel passageway 1390 extending through the dosing lever engager 1354 and the fuel line connector 1356 of the fuel cell receiving block 1350. The fuel passageway 1390 includes a first end 1392 connected to the inner bottom annular surface 1386 and in communication with the stem receiving portion 1380. The fuel passageway 1390 includes a second end 1393 that exits through the fuel line connector 1356 of the fuel cell receiving block 1350.

As shown in FIGS. 8 to 10, the fuel cell receiving block 1350 is mounted on the stem 1430 of the fuel cell adapter 1400 via the stem connector 1352. The stem 1430 extends into the stem receiving portion 1380 and sealingly engages with at least a portion of the fuel cell receiving block 1350. In the illustrated example embodiment, the stem 1430 of the fuel cell adapter 1400 extends into the stem receiving portion 1380 such that the at least a portion of the outer sealing surface 1453 of the sealing portion 1436 engages at least a portion of the inner sealing surface 1384 of the stem receiving portion 1380 to form a fluid tight seal between the fuel cell adapter 1400 and fuel cell receiving block 1350. The fuel passageway 1390 of the fuel cell receiving block 1350 is aligned with the fuel passageway 1447 of the stem 1430 to fluidly couple the fuel cell 1330 to the fuel cell receiving block 1350 and the fuel line 1360.

As best shown in FIG. 10, actuation of the fuel dosing lever 1370 transfers an axial force from the fuel dosing lever 1370 to the fuel cell receiving block 1350. More specifically, actuation of the fuel dosing lever 1370 causes a subsequent actuation of the fuel cell receiving block 1350 and the stem 1430 of the fuel cell adapter 1400. In the illustrated example embodiment, actuation of the stem 1430 causes the fuel cell metering valve 1340 to draw a desired fuel dose from the fuel cell 1330. The fuel dose is then transported through the fuel passageway 1447 of the fuel cell adapter 1400, through the fuel passageway 1390 of the fuel cell receiving block 1350 and the fuel line 1360 and into the combustion chamber 1220 of the tool 1050.

During operation of the tool 1050, the fluid tight seal formed between the outer sealing surface 1453 of the stem 1430 and the inner sealing surface 1384 of the fuel cell receiving block 1350 prohibits fuel from leaking out of the fuel cell 1330. During non-operation and/or idle conditions of the tool, the fuel assembly 1300 maintains the fluid tight seal between the sealing portion 1436 of the stem 1430 and the inner sealing surface 1384 of the fuel cell receiving block 1350. As a result, engagement between the sealing portion 1436 of the stem 1430 and the inner sealing surface 1384 of the fuel cell receiving block prohibits or substantially reduces fuel from leaking out of the fuel cell due to a change of environmental conditions, (e.g., increase or decrease in temperature), a change of fuel cell pressure, or any other such condition.

In the illustrated example embodiment, when the fuel cell receiving block 1350 is connected to the fuel cell adapter 1400, the height (H2) of the second conical portion 1438 causes a fuel receiving gap 1387 between the inner cylindrical surface 1385 and the inner bottom annular surface 1386 of the stem receiving portion 1380 and the second conical portion 1438 of the stem 1430. As such, fuel from the fuel cell 1330 can fill the fuel receiving gap 1387 between the second conical portion 1438 of the stem 1430 and the inner cylindrical surface 1385 and inner bottom annular surface 1386 of the fuel cell receiving block 1350. However, since the fluid tight seal formed between the outer sealing surface 1453 of the stem 1430 and the inner sealing surface 1384 of the fuel cell receiving block 1350 is axially below this fuel receiving gap, any fuel that fills the fuel receiving gap 1387 does not leak. Thus, the fuel cell receiving block 1350 and the fuel cell adapter 1400 form a fuel receiving gap therebetween and that is above the respective sealing surfaces of the fuel cell receiving block 1350 and the fuel cell adapter 1400.

Other embodiments of the fuel cell adapter are contemplated by the present disclosure. In various such embodiments, the second conical portion 1438 has a different shape and/or size than is shown and described in the above embodiment. In various other such embodiments, the second conical portion 1438 is reduced in size or eliminated.

Further embodiments of the fuel cell adapter are contemplated by the present disclosure. In various such embodiments, the stem is configured to be connected to a value of the fuel cell and the fuel cell adapter does not include the fuel cell connector or the arms connecting the stem to the connector.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A fastener driving tool comprising:
a housing;
a fastener driving assembly at least partially positioned in the housing;
a workpiece contact assembly connected to the housing; and
a fuel assembly at least partially positioned in the housing, the fuel assembly including:
a fuel cell receiving assembly positioned in the housing, the fuel cell receiving assembly configured to receive a fuel cell and a fuel cell adapter connected to the fuel cell, the fuel cell adapter including a stem and a fuel cell connector connectable to the fuel cell, the stem including: a base, a first conical portion directly connected to and supported by the base, a sealing portion directly connected to and supported by the first conical portion, the sealing portion defining an outer domed sealing surface, and a second conical portion directly connected to and supported by the sealing portion; and
a fuel cell receiving block shaped and sized to receive the stem of the fuel cell adapter when the fuel cell adapter is received, the fuel cell receiving block including a stem receiving portion including: an outer annular surface, an inner conical surface directly connected to the outer annular surface, an inner cylindrical surface directly connected to the inner conical surface, an inner bottom surface that is annular and that is directly connected to the inner cylindrical surface, and an inner domed surface below the inner bottom surface,
wherein the inner domed surface of the fuel cell receiving block is configured to engage the outer domed sealing surface of the stem when the fuel cell adapter is received to form a fluid tight seal between the fuel cell adapter and the fuel cell receiving block,
wherein the inner cylindrical surface and the inner bottom surface of the stem receiving portion are shaped and sized to receive the second conical portion of the stem, and
wherein the inner bottom surface of the stem receiving portion is shaped and sized to not engage the second conical portion of the stem when the fuel cell adapter is received.

2. The fastener driving tool of claim 1, wherein the fuel cell receiving assembly is configured to receive the fuel cell and the fuel cell adapter connected to the fuel cell such that the outer domed sealing surface of the stem of the fuel cell adapter is axially below the second conical portion of the stem of the fuel cell adapter when the fuel cell adapter is received.

3. The fastener driving tool of claim 1, wherein the fuel cell receiving block is configured to receive the fuel cell adapter such that a fuel receiving gap is defined between the inner cylindrical surface and the inner bottom surface of the stem receiving portion, and the second conical portion of the stem of the fuel cell adapter when the fuel cell adapter is received.

4. The fastener driving tool of claim 3, wherein the fuel cell receiving block is configured to form the fluid tight seal between the fuel cell adapter and the fuel cell receiving block axially below the fuel receiving gap between the inner cylindrical surface and the inner bottom surface of the stem receiving portion, and the second conical portion of the stem when the fuel cell adapter is received.

5. A fastener driving tool fuel cell adapter for a fastener driving tool including a fastener driving assembly, a workpiece contact assembly, and a fuel assembly including a fuel cell receiving block and a fuel cell receiving assembly configured to receive a fuel cell, the fuel cell receiving block having a stem receiving portion including an outer annular surface, an inner conical surface directly connected to the outer annular surface, an inner cylindrical surface directly connected to the inner conical surface, an inner bottom surface that is an annular surface directly connected to the inner cylindrical surface, and an inner domed surface below the inner bottom surface, the fastener driving tool fuel cell adapter comprising:
a stem receivable by the stem receiving portion of the fuel cell receiving block, the stem including:
a base,
a first conical portion directly connected to the base,
a sealing portion directly connected to the first conical portion, the sealing portion defining an outer domed sealing surface shaped and sized to sealingly engage the inner domed surface of the fuel cell receiving block to form a fluid tight seal between the fuel cell adapter and the fuel cell receiving block, and
a second conical portion directly connected to the sealing portion; and
a fuel cell connector connectable to the fuel cell,
wherein the second conical portion of the stem is shaped and sized to be received within the inner cylindrical surface and the inner bottom surface of the stem receiving portion, and wherein the second conical portion of the stem is shaped and sized to not engage the inner cylindrical surface and the inner bottom surface of the stem receiving portion when the fastener driving tool fuel cell adapter is received in the fuel cell receiving block.

6. The fastener driving tool fuel cell adapter of claim 5, wherein the outer domed sealing surface of the stem is axially below the second conical portion of the stem.

7. The fastener driving tool fuel cell adapter of claim 5, wherein the second conical portion of the stem, when received in the fuel cell receiving block, is configured to define a fuel receiving gap between the inner cylindrical surface and the inner bottom surface of the stem receiving portion, and the second conical portion of the stem.

8. The fastener driving tool fuel cell adapter of claim 7, wherein the second conical portion of the stem, when received in the fuel cell receiving block, is configured to form a fluid tight seal between the fastener driving tool fuel cell adapter and the fuel cell receiving block that is axially below the fuel receiving gap between the inner cylindrical surface and the inner bottom surface of the stem receiving portion, and the second conical portion of the stem.

9. A fastener driving tool fuel cell adapter for a fastener driving tool including a fastener driving assembly, a workpiece contact assembly, and a fuel assembly including a fuel cell receiving block and a fuel cell receiving assembly configured to receive a fuel cell, the fuel cell receiving block having a stem receiving portion including an outer annular surface, an inner conical surface directly connected to the outer annular surface, an inner cylindrical surface directly connected to the inner conical surface, an inner bottom surface that is an annular surface directly connected to the inner cylindrical surface, and an inner domed surface below the inner bottom surface, the fastener driving tool fuel cell adapter comprising:
a stem receivable by the stem receiving portion of the fuel cell receiving block, the stem including:
a base,
a first conical portion directly connected to and supported by the base,
a sealing portion directly connected to and supported by the first conical portion, the sealing portion defining an outer domed sealing surface shaped and sized to sealingly engage the inner domed surface of the fuel cell receiving block to form a fluid tight seal between the fuel cell adapter and the fuel cell receiving block, and
a second conical portion directly connected to and supported by the sealing portion;
wherein the second conical portion of the stem is sized and shaped to be received by the inner cylindrical surface and the inner bottom surface of the stem receiving portion such that the second conical portion of the stem does not engage the inner cylindrical surface and the inner bottom surface of the stem receiving portion; and
wherein the stem is connectable to a valve of the fuel cell.

10. The fastener driving tool fuel cell adapter of claim 9, wherein the outer domed sealing surface of the stem is axially below the second conical portion of the stem.

11. The fastener driving tool fuel cell adapter of claim 9, wherein the stem is sized and shaped to be received in the fuel cell receiving block to define a fuel receiving gap between the inner cylindrical surface and the inner bottom surface of the stem receiving portion, and the second conical portion of the stem.

12. The fastener driving tool fuel cell adapter of claim 11, wherein the stem is sized and shaped to be received in the fuel cell receiving block to define the fuel receiving gap between the inner cylindrical surface and the inner bottom surface of the stem receiving portion, and the second conical portion of the stem, such that the fluid tight seal formed is axially below the fuel receiving gap between the inner cylindrical surface and the inner bottom surface of the stem receiving portion, and the second conical portion of the stem.

* * * * *